United States Patent
Tachibana (10) Patent No.: US 11,562,250 B2
(45) Date of Patent: Jan. 24, 2023

(54) INFORMATION PROCESSING APPARATUS AND METHOD

(71) Applicant: KIOXIA CORPORATION, Minato-ku (JP)

(72) Inventor: Fumihiko Tachibana, Yokohama (JP)

(73) Assignee: KIOXIA CORPORATION, Minato-ku (JP)

( * ) Notice: Subject to any disclaimer, the term of this patent is extended or adjusted under 35 U.S.C. 154(b) by 649 days.

(21) Appl. No.: 16/564,286

(22) Filed: Sep. 9, 2019

(65) Prior Publication Data

US 2020/0257983 A1 Aug. 13, 2020

(30) Foreign Application Priority Data

Feb. 13, 2019 (JP) .............................. JP2019-023435

(51) Int. Cl.
*G06N 3/08* (2006.01)
*G06K 9/62* (2022.01)
*G06N 3/04* (2006.01)

(52) U.S. Cl.
CPC ............ *G06N 3/084* (2013.01); *G06K 9/6262* (2013.01); *G06N 3/04* (2013.01)

(58) Field of Classification Search
CPC ........ G06N 3/084; G06N 3/04; G06N 3/0454; G06N 3/0481; G06K 9/6262; G06V 10/82; G06V 10/776
See application file for complete search history.

(56) References Cited

U.S. PATENT DOCUMENTS

| 2010/0110380 | A1* | 5/2010 | Allred | G06T 7/30 351/246 |
| 2016/0217368 | A1 | 7/2016 | Ioffe et al. | |
| 2017/0024643 | A1 | 1/2017 | Lillicrap et al. | |
| 2018/0225166 | A1 | 8/2018 | Maya et al. | |
| 2019/0147320 | A1* | 5/2019 | Mattyus | G06V 10/82 382/155 |
| 2020/0134434 | A1* | 4/2020 | Notsu | G06F 17/18 |
| 2020/0342345 | A1* | 10/2020 | Farhi | G06N 3/063 |

FOREIGN PATENT DOCUMENTS

| JP | 2018-124937 | | 8/2018 |
| JP | 2018-525759 | A | 9/2018 |
| JP | 2018-160200 | | 10/2018 |

OTHER PUBLICATIONS

Sergey Ioffe, et al., "Batch Normalization: Accelerating Deep Network Training by Reducing Internal Covariate Shift", International Conference On Machince Learning (ICML), 2015, 11 pages.
Sergey Ioffe, "Batch Renormalization: Towards Reducing Minibatch Dependence in Batch-Normalized Models", Neural Information Processing Systems (NIPS), 2019, 6 pages.

* cited by examiner

*Primary Examiner* — Marcos L Torres
(74) *Attorney, Agent, or Firm* — Oblon, McClelland, Maier & Neustadt, L.L.P.

(57) ABSTRACT

According to one embodiment, an apparatus includes a processor and a memory. The processor performs a learning process of a neural network including a batch normalization layer. The processor sets up the neural network. The processor updates, in the learning process, a weight parameter and a normalization parameter, used in the normalization of the batch normalization layer, alternately or at different timings.

10 Claims, 6 Drawing Sheets

INFORMATION PROCESSING APPARATUS AND METHOD

CROSS-REFERENCE TO RELATED APPLICATIONS

This application is based upon and claims the benefit of priority from Japanese Patent Application No. 2019-023435, filed Feb. 13, 2019, the entire contents of which are incorporated herein by reference.

FIELD

Embodiments described herein relate generally to an information processing apparatus and an information processing method.

BACKGROUND

A deep neural network (DNN) represented by a convolutional neural network is optimized by a learning process of updating (adjusting) parameters.

In the DNN, the learning process can be stabilized and the learning speed can be improved by a normalization of a batch normalization layer (BN layer). The mainstream of the learning process of the DNN includes a mini-batch learning process, in which a learning set, a data set to be subjected to the learning process, is divided into subsets of mini-batch size, including the normalization of the BN layer. The mini-batch size is the number of learning samples used for one-time inference process and learning process including parameter updating, and may be about 10 to 100, for example.

As compared with a normal batch learning process, the mini-batch learning process improves the speed of the learning process, but it is preferable that the mini-batch size be smaller in order to reduce a memory capacity necessary for a calculation in the learning process. Where the mini-batch size is relatively small, however, it has been recognized that a learning accuracy is degraded. Although a batch renormalization method has been proposed as a method of suppressing the degradation of the learning accuracy where the mini batch size is small, this method is not necessarily effective.

DETAILED DESCRIPTION

According to one embodiment, an information processing apparatus includes a processor configured to perform a learning process of a neural network including a batch normalization layer; and a memory configured to be used in the learning process performed by the processor. The processor is configured to: set up the neural network; and perform, in the learning process, an update of a weight parameter and an update of a normalization parameter used in normalization of the batch normalization layer alternately or at different timings.

Various embodiments will be described hereinafter with reference to the accompanying drawings.

[System Configuration]

Figure 1:
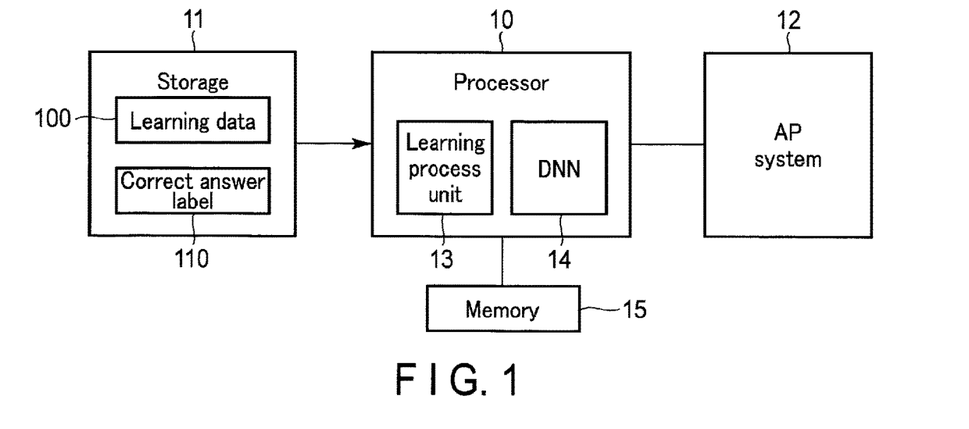
FIG. 1 is a block diagram illustrating a configuration of a system according to an embodiment.

FIG. 1 is a block diagram illustrating a configuration of a system of a present embodiment. As shown in FIG. 1, the system includes a processor 10, a storage 11, and an application (AP) system 12, which are elements of the present embodiment.

In the present embodiment, the processor 10 is, for example, a graphic processing unit (GPU) or a central processing unit (CPU), and is configured as hardware and software. The processor 10 causes a learning process unit 13, which is software, to perform a learning process for a deep neural network (DNN) 14, using the memory 15. The present embodiment relates to a learning process which is performed in a convolutional neural network (CNN), an example of the DNN, and which is effective, for example, for an image recognition process using images as input data.

The storage 11 stores learning data (or training data) 100 necessary for the learning processes of the CNN and correct answer labels (supervised data indicating correct answers) 110. The storage 11 outputs the learning data 100 and the correct answer labels 110 in response to an access from the processor 10.

The AP system 12 is an image recognition system that uses the CNN optimized by the processor 10 and recognizes, for example, an unknown input image. The image recognition system includes a computer, a server system, or a cloud system that performs web services, which are constituted by hardware and software.

Figure 2:
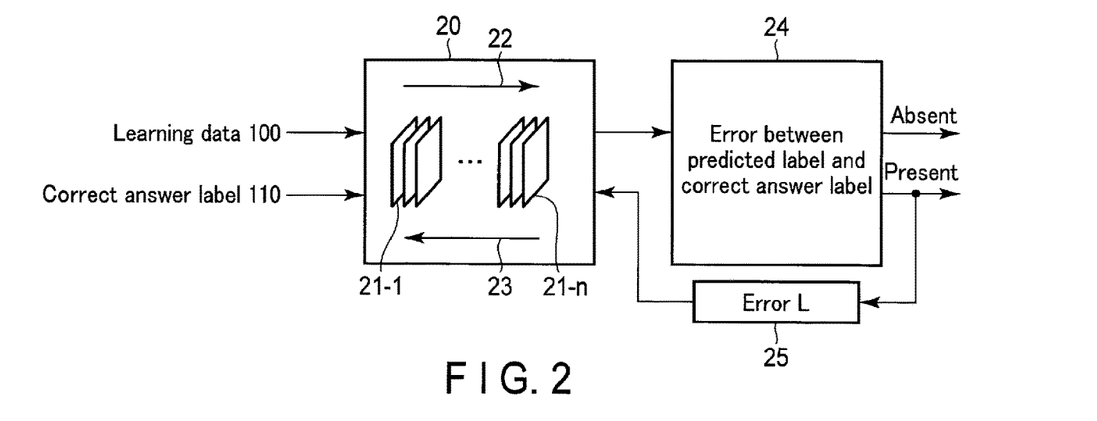
FIG. 2 is a diagram illustrating an outline of a learning process in the embodiment.

FIG. 2 is a diagram illustrating an outline of a learning process in the embodiment. As shown in FIG. 2, the CNN 20 includes an intermediate layer which is between an input layer (not shown) and an output layer (not shown) and which includes a plurality of layers 21-1 to 21-$n$ representing a convolution layer (hereinafter referred to as a CV layer). The intermediate layer is also called a hidden layer. According to the present embodiment, the learning process unit 13 divides the learning data 100 into subsets of mini batch size, in each of the layers 21-1 to 21-$n$ of the CNN 20, and performs a learning process (mini-batch learning process) on input data which are input in units of subsets.

As a learning process in each of the layer 21-1 to 21-$n$ of the CNN 20, the learning process unit 13 performs forward propagation 22 of the output value of a preceding layer to a subsequent layer, and back propagation 23 of an error in the reverse direction. That is, the CNN 20 is a forward propagation neural network that updates parameters (weight parameters and normalization parameters) by the back propagation 23 of errors.

The learning process unit 13 causes a determination unit 24 to determine the presence/absence of an error between an output (predicted label) of the CNN 20 and a correct answer label acquired from the storage 11. Where the determination result indicates that an error is present, the error (L) is back-propagated to the CNN 20 (25). The learning process unit 13 repeatedly performs, in the CNN 20, a parameter updating process described later or a learning process of a predetermined number of times, until the error falls below a predetermined value.

Figure 3:
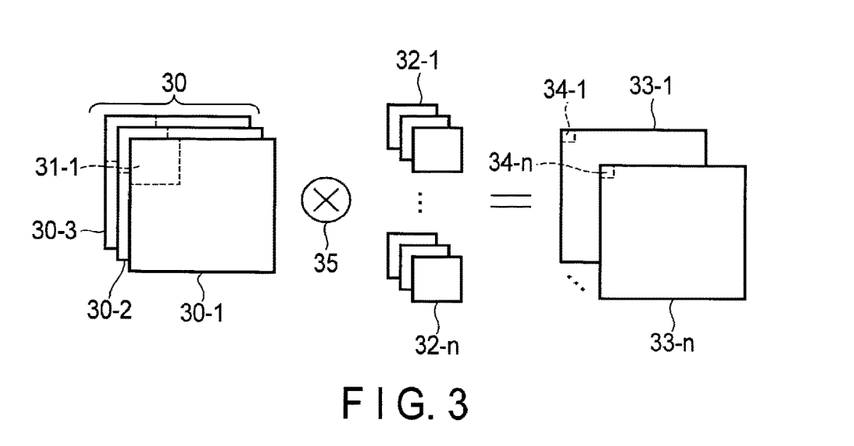
FIG. 3 is a diagram illustrating an outline of a convolution process in the embodiment.

FIG. 3 is a diagram illustrating an outline of a convolution process in the CV layer of the CNN 20 in the embodiment.

As shown in FIG. 3, in the present embodiment, input data 30 of the mini-batch size is input to the CV layer of the CNN 20, and a convolution process included in the mini-batch learning process described above is performed. The input data 30 of the mini-batch size is obtained by dividing the learning data 100 to be subjected to the learning process into subsets of a predetermined size.

In the mini-batch learning process, one-time parameter update is collectively performed for each learning process of the input data 30. For example, where the learning data 100 is a data set of 60,000 images and if the mini-batch size is "10", the input data 30 corresponds to a subset of 10 images. When a data set of 60,000 images is subjected to a learning process, with a mini-batch size of "10", parameter update is performed 6,000 times (=60,000/10). Generally, the mini-batch size is approximately 10 to 100.

In the CNN 20, the learning process unit 13 of the present embodiment randomly extracts input data 30 of subset units from the learning data 100, and performs one-time learning process (including parameter update). When a one-time mini-batch learning process ends, the learning process unit 13 randomly accesses the next subset and proceeds to the next learning process. The learning process unit 13 repeats the learning process for all data sets of an image, which is the learning data 100.

In this case, the number of repetitions of the learning process (for example, corresponding to the number of times parameter update is performed) in which the learning data 100 is one unit is called an epoch. That is, if the number of epochs is "1", the number of times parameter update is performed in the above-mentioned specific example is "6,000". If the learning accuracy is insufficient, the learning process unit 13 sets the number of epochs to, for example, "3" and repeats the learning process in which the learning data 100 is one unit, three times. That is, in the learning process of the CNN 20, the number of times parameter update is performed is determined by the mini-batch size and the number of epochs.

For example, in the case of an 8×8 pixel size input data 30-1, the learning process unit 13 performs, for example, a convolution process (35) using weight filter 32-1 for a 3×3 pixel size 31-1 in the CV layer. By this convolution process (35), feature amount 33-1 including response value 34-1 is calculated. In the learning process, the convolution process is repeatedly performed n times (the above-mentioned number of times parameter update is performed), using weight filter 32-n in which the weight parameter (including a weight and a bias) is updated, and feature value 33-n including response value 34-n is updated. In the CNN 20, feature amount 33-n is propagated to the output layer via a batch normalization layer (BN layer) or an activation layer included in the intermediate layer, as described later. In the output layer, the difference (error) between the extracted feature amount and the correct answer label is calculated, and the error is back-propagated.

Figure 4:
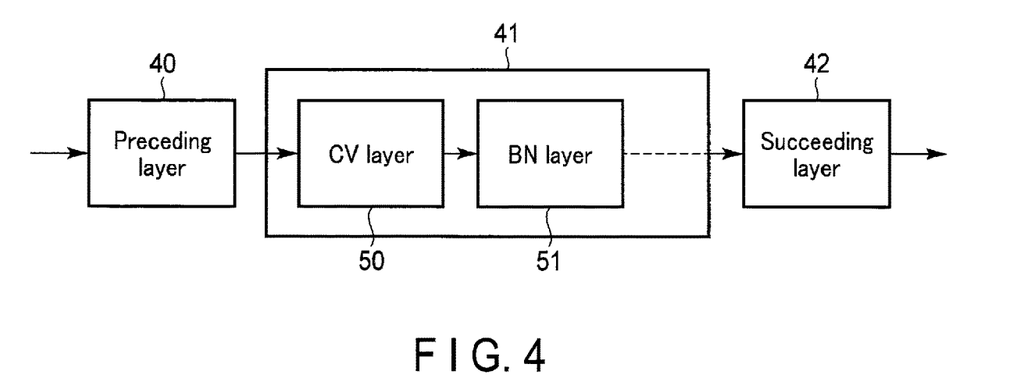
FIG. 4 is a block diagram illustrating an example of a CNN in the embodiment.
Figure 5:
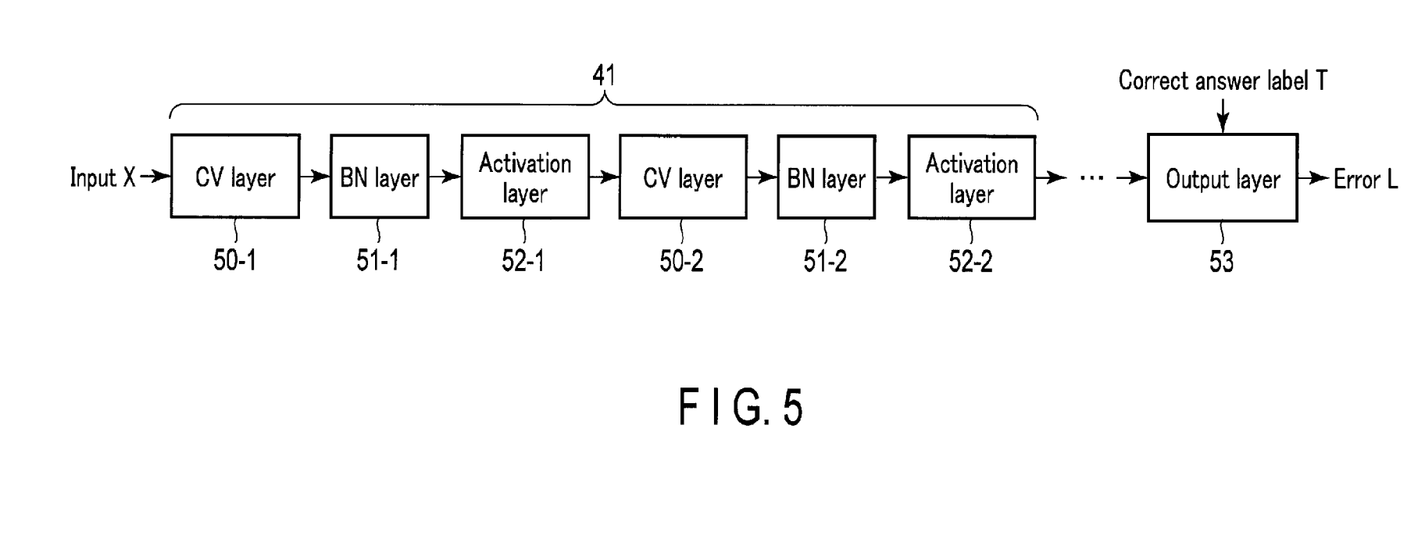
FIG. 5 is a block diagram illustrating another example of a CNN in the embodiment.

FIG. 4 and FIG. 5 are block diagrams illustrating examples of the CNN of the embodiment. As shown in FIG. 4, the CNN of the present embodiment includes a preceding layer 40 and a succeeding layer 42 with respect to the intermediate layer 41. The preceding layer 40 includes an input layer which is on the input side of the intermediate layer 41. The succeeding layer 42 includes an output layer which is on the output side of the intermediate layer 41.

The intermediate layer 41 of the present embodiment includes a CV layer 50 and a batch normalization layer (BN layer) 51, which is an adjacent layer to the CV layer. As shown in FIG. 5, the intermediate layer 41 is of multi-stage configuration and includes a first stage layer including CV layer 50-1, BN layer 51-1 and activation layer 52-1, and a second stage layer including CV layer 50-2, BN layer 51-2 and activation layer 52-2. There may be a case where the succeeding layer 42 shown in FIG. 4 includes a fully connected layer in the stage preceding the output layer 53.

A description will be given as to how the CV layer 50 (50-1, 50-2) and the BN layer 51 (51-1, 51-2) perform the parameter updating process in the learning process of the present embodiment. The CV layer 50 performs a convolution process for input data 30 of mini-batch size (the input data may be referred to as input data X) (see FIG. 3). The learning process of the present embodiment is performed by the learning process unit 13. The parameter updating process will be described below, referring mainly to the CV layer 50 and the BN layer 51.

In the learning process (mini-batch learning process) of the present embodiment, the BN layer 51 adjusts the distribution of the features calculated by the CV layer 50 and performs normalization so as to eliminate the distribution bias. That is, the BN layer 51 performs the normalization corresponding to whitening and affine transformation, and adjusts the feature distributions between mini-batch learning processes to be close to each other.

Specifically, as described later, the BN layer 51 calculates an average value $\mu$ and a dispersion value $\sigma$ with respect to feature amounts output from the CV layer 50, and performs normalization such that the average value $\mu$ becomes 0 and the dispersion value $\sigma$ becomes 1. The CV layer 50 outputs a feature amount corresponding to input data X of mini-batch size. Furthermore, the BN layer 51 uses a scaling coefficient $\gamma$ and a shift offset value $\beta$ and calculates a new feature (referred to as output data Y). As a result, the great change in input data X can be suppressed in each learning process, the learning process of the intermediate layer can be stabilized, and the learning speed (the convergence speed of learning) can be improved. Activation layers 52 (52-1, 52-2) perform, for example, an activation process (a numerical value conversion process) using an activation function ReLU (Rectified Linear Unit).

The output layer 53 calculates an error L between a predicted label, which is an output of the image recognition process of the CNN, and a correct answer label T. The CNN repeatedly performs the learning process until the error falls below a predetermined value or for a predetermined number of times of the learning process (a predetermined number of epochs) (see FIG. 2). As will be described later, the learning process of the present embodiment includes back propagation of errors, an update process of weight parameters (including weight W and bias B) performed by the CV layer 50, and an update process of normalization parameters performed by the BN layer 51.

[Learning Process of CNN]

Figure 6:
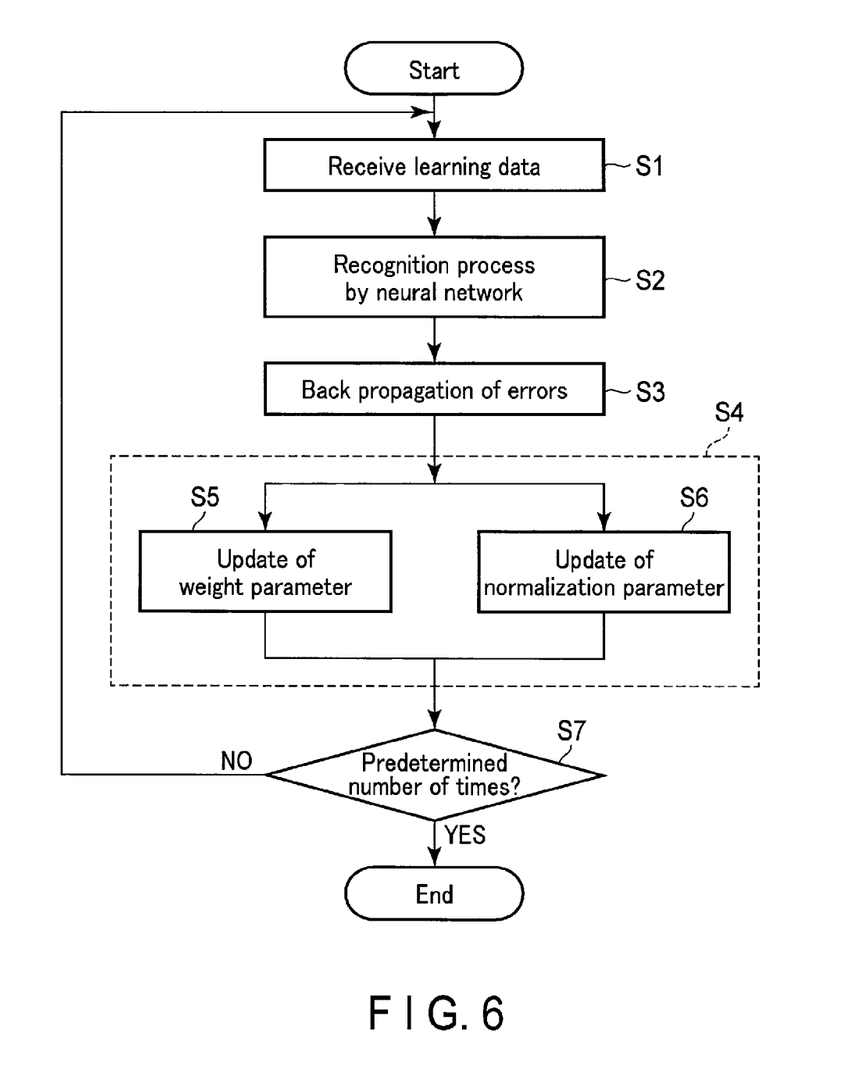
FIG. 6 is a flowchart illustrating a learning process in the embodiment.
Figure 7:
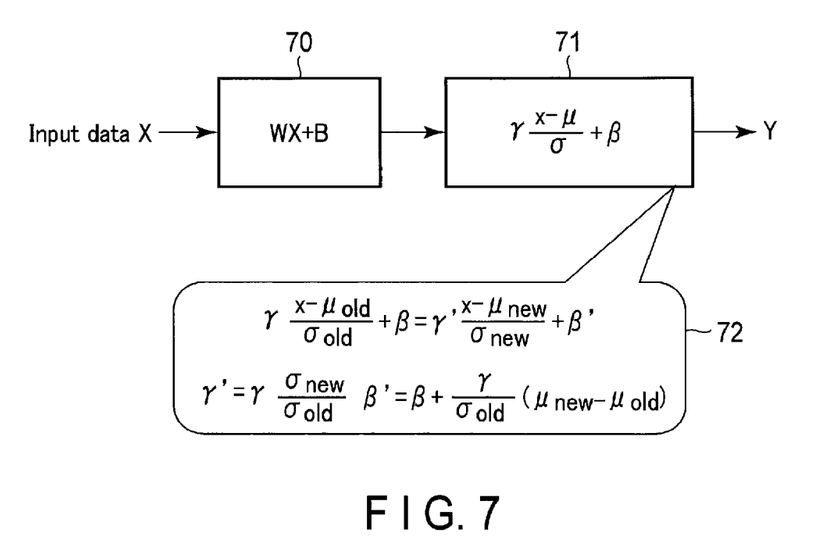
FIG. 7 is a diagram illustrating an outline of a parameter updating process in the embodiment.

Hereinafter, the learning process of the CNN according to the present embodiment will be described with reference to FIG. 6 and FIG. 7. FIG. 6 is a flowchart illustrating a procedure of the learning process of the CNN according to the embodiment. FIG. 7 is a diagram illustrating an outline of a process of updating a weight parameter and a process of updating a normalization parameter.

The procedure of the learning process of the CNN of the present embodiment will be described with reference to FIG. 6. As described above, the CNN of the present embodiment performs the mini-batch learning process. In the mini-batch learning process, a one-time parameter updating process is performed each time a learning process is performed for input data X of mini-batch size.

As shown in FIG. 6, the CNN randomly receives input data X of mini-batch size from the learning data 100 (S1). Where the learning data 100 is, for example, a data set of 60,000 images, input data X of mini-batch size corresponds to a subset obtained by dividing the data set. Input data X is, for example, 32 images.

The CNN performs an image recognition process by performing multi-stage processes (the convolution process, normalization, etc.) shown in FIG. 5 (S2). As shown in FIG. 3, the CV layer 50 performs a convolution process using a weight filter and calculates a feature corresponding to input data X. That is, the CV layer 50 performs a convolution process using weight parameters (including weight W and bias B).

The BN layer 51, an adjacent layer to the CV layer 50, performs normalization of a feature amount output from the CV layer 50. Specifically, the BN layer 51 performs normalization using a normalization parameter (see "71" of FIG. 7). Specifically, the BN layer 51 calculates an average value $\mu$ and a dispersion value $\sigma$ for each input data unit of mini-batch size, subtracts the average value $\mu$ of feature amounts from the CV layer 50, and performs normalization in which division with the dispersion value $\sigma$ is performed, in order to calculate a new feature amount (Y).

The BN layer 51 may shift the input to the next layer by a learnable offset $\beta$ with respect to the result of the normalization, and perform scaling by a scale coefficient $\gamma$. As a result, adjustment of the result of the normalization (parameters at the time of affine transformation) is enabled. In this way, the BN layer 51 can suppress the fluctuations which may occur when the result is input to the next layer, and can therefore suppress the distribution fluctuations between mini-batches.

After the output layer 53 calculates the error L between the predicted label, which is the output of the recognition process (S2), and the correct answer label T, the CNN performs back propagation of the error (S3). The back propagation includes a process of back-propagating of the error L to the intermediate layer 41. The CNN performs an update process of parameters (a weight parameter and a normalization parameter) in accordance with the back propagation of the error (S4).

According to the present embodiment, in the update process of parameters, the CNN performs the process of updating the weight parameter of the CV layer 50 (S5) and the process of updating the normalization parameter of the BN layer 51 (S6) alternately, and does not perform these processes simultaneously. That is, in the parameter updating process, the CNN performs the weight parameter updating process (S5) and the normalization parameter updating process (S6) at different timings based on a predetermined condition (described later).

That is, as shown in FIG. 7, the CNN updates the weight parameters (weight W and bias B) of the convolution process (70) of the CV layer 50 (S5). The CNN determines whether the number of times of a learning process is performed (the number of repetitions) exceeds a predetermined number of times (S7). Where the number of times of a learning process is performed does not exceed the predetermined number of times, the CNN does not perform the update process of the normalization parameter of the BN layer 51 (the fixing of the normalization parameter), and the learning process is repeated from the initial input process (S1) (NO in S7).

That is, the CNN repeats the recognition process (S2) and the back propagation of the error (S3). Similarly, the CNN performs a parameter updating process along with the back propagation of the error (S4). According to the present embodiment, in the parameter updating process, the CNN performs the normalization parameter updating process (S6) without performing the weight parameter updating process (S5) (the fixing of the weight parameter).

That is, as shown in FIG. 7, the CNN updates the normalization parameters of the normalization (71) of the BN layer 51 without updating the weight parameters of the convolution process (70) of the CV layer 50 (S6). The normalization parameters include an average value $\mu$, a variance value $\sigma$, a scaling coefficient $\gamma$ and a shift offset value $\beta$ in the unit of input data X of mini-batch size.

The BN layer 51 performs normalization using normalization parameters including updated average value $\mu$new, variance value $\sigma$new, scaling coefficient $\gamma'$ and shift offset value $\beta'$ (72). Average value $\mu$old, dispersion value $\sigma$old, scaling coefficient $\gamma$, and shift offset value $\beta$ are parameters before the update process.

Where the number of times of a learning process is performed does not exceed the predetermined number of times (NO in S7), the weight parameters of the convolution process (70) of the CV layer 50 are not updated, and the learning process is repeated from the initial input process (S1). Where the number of times of a learning process is performed reaches the predetermined number of times (YES in S7), the CNN ends performing of the learning process.

As described above, according to the present embodiment, where the learning process necessary for CNN optimization is performed and the parameter updating process is executed along with the back propagation of the error, the weight parameter updating process and the normalization parameter updating process are not performed simultaneously but are performed alternately. As a result, the influence of the fluctuation (variation) of the normalization parameter can be suppressed at the time of updating the weight parameter, and consequently the learning accuracy can be improved.

According to the present embodiment, the CNN performs the weight parameter updating process and the normalization parameter updating process alternately or at different timings based on a predetermined condition. In an example of the predetermined condition, each update process is switched each time a learning process is performed for one epoch. For example, in a learning process for the first epoch, the normalization parameter is fixed and only the weight parameter updating process is performed. In a learning process for the next epoch, the weight parameter is fixed and only the normalization parameter updating process is performed.

In another example of the predetermined condition, the CNN switches each update process if the error amount between a predicted label, which is a learning result, and a correct answer label exceeds a predetermined threshold. That is, the CNN first updates only the weight parameter by a predetermined number of times and then performs the process of fixing the normalization parameter. If the error amount exceeds the predetermined threshold and a learning accuracy within the allowable range cannot be ensured, the weight parameter is fixed and the operation is switched to the process of updating only the normalization parameter.

Figure 8:
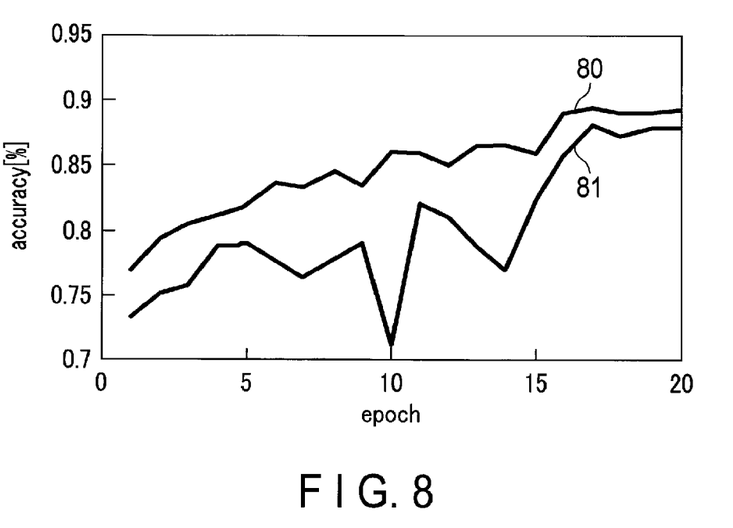
FIG. 8 is a diagram illustrating how learning accuracy is improved in the embodiment.

FIG. 8 is a graph illustrating characteristics 80 of the learning accuracy for each epoch in the learning process according to the present embodiment, in comparison with characteristics 81 of the learning accuracy in the learning process according to a comparative example. The comparative example represents a case where the weight parameter updating process and the normalization parameter updating process are performed simultaneously where the parameter updating process is performed along with the back propagation of the error. As an example, FIG. 8 shows a result of a learning process that is performed with a batch size of 1, using a CNN model whose accuracy is 60% in pre-training.

As shown in FIG. 8, the learning accuracy (characteristics 80) of the learning process of the present embodiment is higher to the learning accuracy (characteristics 81) of the learning process of an existing method for in each epoch (for example, 10, 15 and 20). For example, at 20 epochs, the learning accuracy of the learning process of the present embodiment converges to about 0.9.

[Modification]

Figure 9:
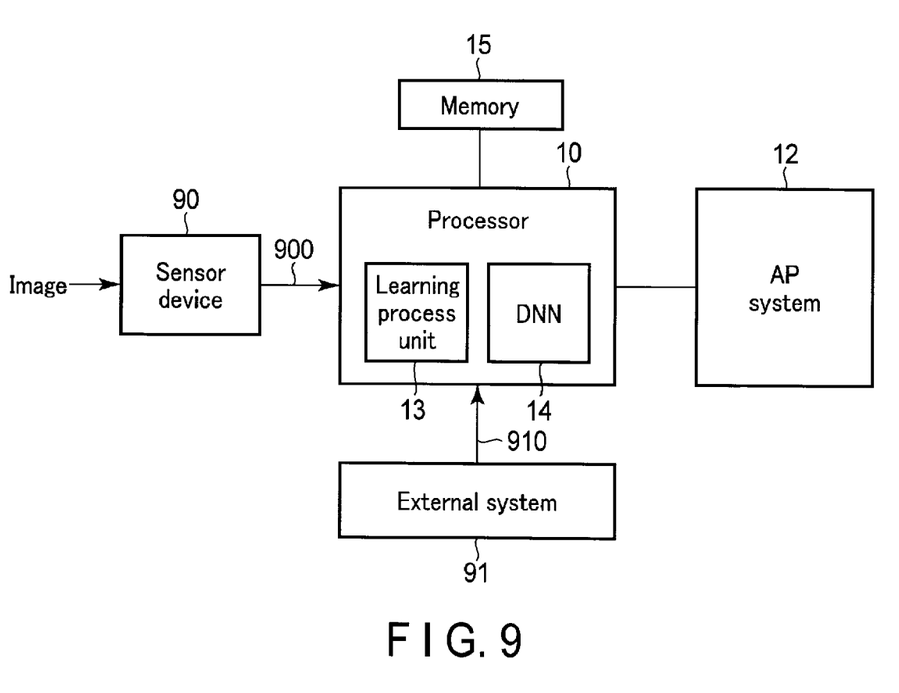
FIG. 9 is a block diagram illustrating a configuration of a modification of the embodiment.

FIG. 9 is a block diagram illustrating a configuration of a modification of the present embodiment. In FIG. 9, elements similar to those of the system of the above embodiment shown in FIG. 1 are denoted by the same reference symbols, and a description of such elements is omitted.

As shown in FIG. 9, in the system of the present modification, the processor 10 uses image data 900 output from a sensor device 90 in the learning process of the CNN as data for adjusting (tuning) weight parameters and normalization parameters. The sensor device 90 sends image data 900, obtained by scanning an image on one sheet, to the processor 10.

Further, the processor 10 acquires a correct answer label 910 corresponding to the image data 900 (for example, data identifying the image) from an external system 91, which is, for example, a cloud system connected via a network. The processor 10 uses the image data 900 and the correct answer label 910 to perform the learning process of the present embodiment as described above. The advantages of the learning process are the same as the embodiment, and thus a description thereof is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processor configured to perform a learning process of a neural network including a batch normalization layer; and
a memory configured to be used in the learning process performed by the processor,
wherein the processor is configured to:
set up the neural network;
perform, in the learning process, an update of a weight parameter and an update of a normalization parameter used in normalization of the batch normalization layer at different timings based on a predetermined condition; and
perform a fixing of the weight parameter and the update of the normalization parameter in response to a learning accuracy of the neural network being lowered below a threshold after performing the update of the weight parameter.

2. The apparatus of claim 1, wherein the processor is configured to switch between the update of the weight parameter and the update of the normalization parameter each time a predetermined learning process is repeated.

3. The apparatus of claim 1, wherein the update of the normalization parameter includes adjusting a parameter for affine transformation of an output of the normalization.

4. The apparatus of claim 1, wherein the processor is configured to perform the update of the weight parameter and the update of the normalization parameter at different timings, while a back propagation process of an error included in the learning process of the neural network is performed.

5. The apparatus of claim 1, wherein the neural network includes:
a first stage layer including a first convolution layer and a first batch normalization layer; and
a second stage layer including a second convolution layer and a second batch normalization layer.

6. A method for a learning process of a neural network including a batch normalization layer, the method comprising:
setting up the neural network; and
performing, in the learning process, an update of a weight parameter and an update of a normalization parameter used in normalization of the batch normalization layer at different timings based on a predetermined condition, the performing including performing a fixing of the weight parameter and the update of the normalization parameter in response to a learning accuracy of the neural network being lowered below a threshold after performing the update of the weight parameter.

7. The method of claim 6, wherein the performing includes switching between the update of the weight parameter and the update of the normalization parameter each time a predetermined learning process is repeated.

8. The method of claim 6, wherein the update of the normalization parameter includes adjusting a parameter for affine transformation of an output of the normalization.

9. The method of claim 6, wherein the performing includes performing the update of the weight parameter and the update of a normalization parameter at different timings, while a back propagation process of an error included in the learning process of the neural network is performed.

10. The method of claim 6, wherein the neural network includes:
a first stage layer including a first convolution layer and a first batch normalization layer; and
a second stage layer including a second convolution layer and a second batch normalization layer.

* * * * *